US012656782B2

(12) United States Patent
Yasuyama et al.

(10) Patent No.: US 12,656,782 B2
(45) Date of Patent: Jun. 16, 2026

(54) MOVING OBJECT MANAGEMENT DEVICE, MOVING OBJECT MANAGEMENT SYSTEM, AND REMOTE CONTROL FUNCTION DISABLEMENT METHOD

(71) Applicant: TOYOTA JIDOSHA KABUSHIKI KAISHA, Toyota (JP)

(72) Inventors: Shogo Yasuyama, Okazaki (JP); Keigo Ikeda, Nisshin (JP); Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 18/599,331

(22) Filed: Mar. 8, 2024

(65) Prior Publication Data

US 2024/0345589 A1 Oct. 17, 2024

(30) Foreign Application Priority Data

Apr. 13, 2023 (JP) ................................. 2023-065478

(51) Int. Cl.
| | |
|---|---|
| *G05D 1/227* | (2024.01) |
| *G05D 1/698* | (2024.01) |
| *G05D 107/70* | (2024.01) |
| *G05D 109/10* | (2024.01) |
| *G05D 111/30* | (2024.01) |

(52) U.S. Cl.
CPC ........... *G05D 1/2274* (2024.01); *G05D 1/698* (2024.01); *G05D 2107/70* (2024.01); *G05D 2109/10* (2024.01); *G05D 2111/30* (2024.01)

(58) Field of Classification Search
CPC .. G05D 1/2274; G05D 1/698; G05D 2111/30; G05D 2107/70; G05D 2109/10
See application file for complete search history.

(56) References Cited

U.S. PATENT DOCUMENTS

| | | | | |
|---|---|---|---|---|
| 6,472,836 | B1 * | 10/2002 | Uebelein | H02H 7/0851 |
| | | | | 318/434 |
| 11,679,894 | B1 * | 6/2023 | Chinoy | G08G 5/58 |
| | | | | 701/2 |
| 2008/0055050 | A1 * | 3/2008 | Brown | H04L 67/12 |
| | | | | 340/10.41 |
| 2017/0270291 | A1 | 9/2017 | Suzuki et al. | |
| 2017/0320529 | A1 | 11/2017 | Nordbruch | |
| 2021/0053574 | A1 * | 2/2021 | Bielby | H04L 43/0876 |

(Continued)

FOREIGN PATENT DOCUMENTS

| | | |
|---|---|---|
| JP | 2008-197877 A | 8/2008 |
| JP | 2017-167916 A | 9/2017 |

(Continued)

*Primary Examiner* — Hussein Elchanti
(74) *Attorney, Agent, or Firm* — Oliff PLC

(57) ABSTRACT

A moving object management device manages a plurality of moving objects, each moving object having a remote control function to move by remote control. The moving object management device includes an information acquisition unit configured to acquire vulnerability information regarding vulnerability of the remote control function; and a disablement instruction unit configured to instruct a moving object having the vulnerability extracted by using the vulnerability information to disable the remote control function.

14 Claims, 13 Drawing Sheets

(56) References Cited

U.S. PATENT DOCUMENTS

| | | | | |
|---|---|---|---|---|
| 2021/0320928 A1* | 10/2021 | Stuck | .................. | H04L 63/1441 |
| 2022/0272540 A1* | 8/2022 | Hayes | ................. | H04W 12/128 |
| 2023/0205181 A1 | 6/2023 | Kishikawa et al. | | |
| 2023/0409054 A1* | 12/2023 | Bradley | ................. | G05D 1/106 |
| 2024/0080673 A1* | 3/2024 | Newman | ............... | H04W 24/10 |
| 2024/0134995 A1* | 4/2024 | Madala | ................. | G06F 21/577 |
| 2024/0345589 A1* | 10/2024 | Yasuyama | .............. | G06Q 50/40 |

FOREIGN PATENT DOCUMENTS

| | | | |
|---|---|---|---|
| JP | 2017-538619 A | 12/2017 | |
| JP | 2023-035334 A | 3/2023 | |
| WO | 2022/049636 A1 | 3/2022 | |

* cited by examiner

| VEHICLE IDENTIFICATION INFORMATION | PROGRAM INFORMATION | VULNERABILITY |
|---|---|---|
| ID1 | VERSION V1 | YES |
| ID2 | VERSION V1 | YES |
| ID3 | VERSION V2 | NO |
| . . . | . . . | . . . |

Figure 6:
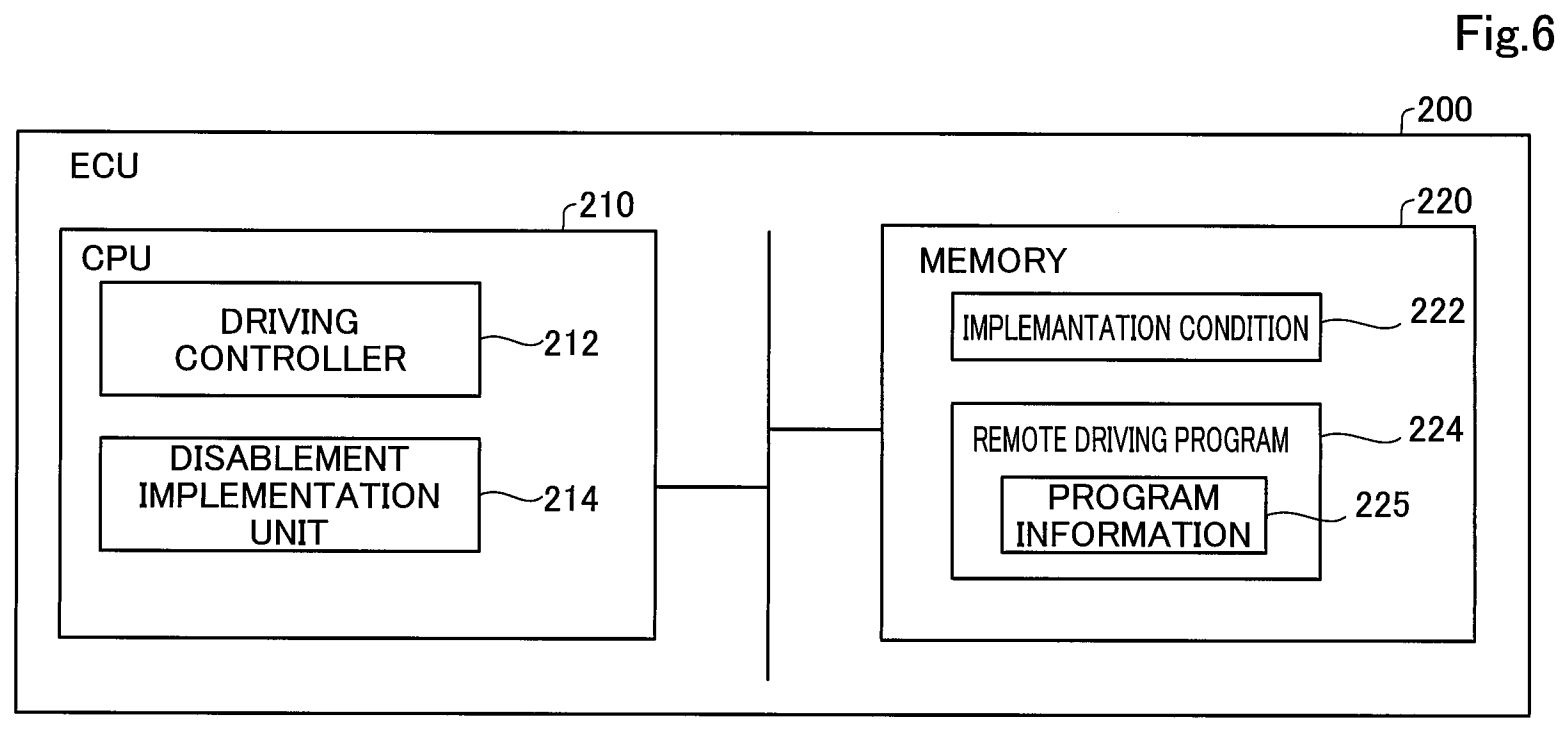

ECU

CPU 210

DRIVING CONTROLLER 212

DISABLEMENT IMPLEMENTATION UNIT 214

MEMORY 220

IMPLEMANTATION CONDITION 222

REMOTE DRIVING PROGRAM 224

PROGRAM INFORMATION 225

1

MOVING OBJECT MANAGEMENT DEVICE, MOVING OBJECT MANAGEMENT SYSTEM, AND REMOTE CONTROL FUNCTION DISABLEMENT METHOD

CROSS-REFERENCE TO RELATED APPLICATIONS

This application claims priority to Japanese Patent Application (Application No. 2023-065478) filed on Apr. 13, 2023, which is incorporated herein by reference in its entirety.

BACKGROUND

The present disclosure relates to a moving object management device, a moving object management system, and a remote control function disablement method.

For example, Japanese Unexamined Patent Application Publication (Translation of PCT Application) No. 2017-538619 discloses a vehicle running method for a manufacturing system for manufacturing vehicles, in which a vehicle is made to run by remote control from the terminal end of the assembly line of the manufacturing system to the parking lot of the manufacturing system.

There has been a requirement for the use of automatic driving by remote control also after it is used inside the factory for manufacturing moving objects, for example, for transporting moving objects at transit points after the moving objects have been shipped from the factory, loading the moving objects onto a vessel or the like, as well as for businesses using automatic driving at the shipping destination. However, if a vulnerability in the remote control function, such as a security hole, is found, the remote control function for the moving objects that have been shipped may be exploited.

SUMMARY

The present disclosure may be realized by the following aspects.

(1) According to one aspect of the present disclosure, a moving object management device that manages a plurality of moving objects is provided, each moving object having a remote control function to move by remote control. This moving object management device comprises an information acquisition unit configured to acquire vulnerability information regarding vulnerability of the remote control function, and a disablement instruction unit configured to instruct a moving object having the vulnerability extracted by using the vulnerability information to disable the remote control function.

The moving object management device according to this aspect is capable of disabling the remote control function of a moving object having vulnerability based on the acquired vulnerability information, thereby inhibiting or preventing misuse of the remote control function of the moving object after the shipment.

(2) The moving object management device according to the above aspect may further comprise a correspondence data storage unit configured to store correspondence data between identification information of the moving object and program information regarding the remote control function provided in the moving object. When the program information having the vulnerability is identified by using the acquired vulnerability information, the disablement instruction unit may extract the identification information of the moving object having the identified program information using the stored correspondence data and may instruct a plurality of the moving objects corresponding to the extracted identification information to disable the remote control function.

The moving object management device according to this aspect is capable of identifying a moving object having vulnerability by a simple process of using the correspondence data.

(3) The moving object management device according to the above aspect may further comprise an identification unit configured to identify the program information having the vulnerability using the acquired vulnerability information.

The moving object management device according to this aspect is capable of rapidly extracting a plurality of moving objects having vulnerability compared to the case of manually identifying the program information having vulnerability.

(4) In the moving object management device according to the above aspect, the information acquisition unit may acquire the vulnerability information further by analyzing data containing at least one of text and image via the Internet.

The moving object management device according to this aspect is capable of automatically acquiring the vulnerability information and expanding the acquisition range for the vulnerability information.

(5) The moving object management device according to the above aspect may further comprise a notification unit configured to notify the extracted moving object having the vulnerability to prompt performing at least one of disablement of the remote control function and an action to eliminate the vulnerability.

The moving object management device according to this aspect is capable of prompting the disablement of the remote control function and the implementation of the action to address the vulnerability, thereby rapidly eliminating the risk caused by the vulnerability of the remote control function.

(6) The moving object management device according to the above aspect may further comprise a disablement implementation unit configured to perform a disablement process to disable the remote control function when, after an instruction to disable the remote control function is made, a predetermined implementation condition is satisfied.

The moving object management device according to this aspect is capable of setting the timing for disabling the remote control function to any timing at which the implementation condition is satisfied.

(7) In the moving object management device according to the above aspect, the implementation condition may be such that radio waves for remote control which have been detected by a moving object are no longer detected, the moving object comprising the disablement implementation unit and a moving object communication unit for receiving the radio waves for the remote control, and having received an instruction to disable the remote control function.

The moving object management device according to this aspect is capable of using the radio waves for wireless communication used for the remote control of the moving object for the implementation condition as so-called geofencing.

(8) In the moving object management device according to the above aspect, the implementation condition may be such that a moving object that has received an instruction to disable the remote control function has been stopped.

The moving object management device according to this aspect is capable of inhibiting or preventing implementation of the disablement process during movement of the moving object by remote control.

(9) In the moving object management device according to the above aspect, the implementation condition may be such that the remote control function is not used in the moving object.

The moving object management device according to this aspect is capable of inhibiting or preventing implementation of the disablement process during movement of the moving object by remote control.

(10) In the moving object management device according to the above aspect, the implementation condition may be such that a moving speed of a moving object that has received an instruction to disable the remote control function falls to or below a predetermined reference speed.

The moving object management device according to this aspect is capable of disabling the remote control function in the state where the moving object is moving at or below the reference speed.

(11) In the moving object management device according to the above aspect, the implementation condition may be such that all passengers on board the moving object have gotten off the moving object.

The moving object management device according to this aspect is capable of inhibiting or preventing disablement of remote control in the state where passengers are on board the moving object that is moving by remote control.

(12) In the moving object management device according to the above aspect, the moving object may be a vehicle that is capable of running by the remote control within a factory during a manufacturing process in the factory where the vehicle is manufactured.

The moving object management device according to this aspect is capable of inhibiting or preventing misuse of remote control function of moving objects during a manufacturing process in the factory.

(13) In the moving object management device according to the above aspect, the vulnerability information may be at least one of information regarding security hole in the remote control function, information regarding hacking of the remote control function, information regarding defect in a program regarding the remote control function, information regarding computer virus that affects the remote control function, and information regarding distrust of the remote control function.

(14) According to another aspect of the present disclosure, a moving object management system that manages a plurality of moving objects is provided, each moving object having a remote control function to move by remote control. This moving object management system comprises a disablement implementation unit that is provided in the moving object and configured to perform a disablement process to disable the remote control function, an information acquisition unit configured to acquire vulnerability information regarding vulnerability of the remote control function, and a disablement instruction unit configured to instruct the disablement implementation unit of a moving object extracted as a moving object having the vulnerability using the acquired vulnerability information to disable the remote control function.

The moving object management system according to this aspect is capable of disabling the remote control function of a moving object having vulnerability based on the acquired vulnerability information, thereby inhibiting or preventing misuse of the remote control function of the moving object.

The present disclosure may also be implemented in various aspects other than the moving object management device and the moving object management system. For example, the present disclosure may also be implemented in aspects of a moving object, a server, a method for managing a moving object, a method for producing a moving object, a method for controlling a moving object, a method for controlling a moving object management device, a computer program for realizing these control methods, a non-transitory storage medium storing the computer programs, and the like.

BRIEF DESCRIPTION OF THE DRAWINGS

FIG. 3 is an explanatory view of an overview of correspondence data;

FIG. 6 is a block diagram of an internal functional structure of ECU;

DETAILED DESCRIPTION

A. First Embodiment

Figure 1:
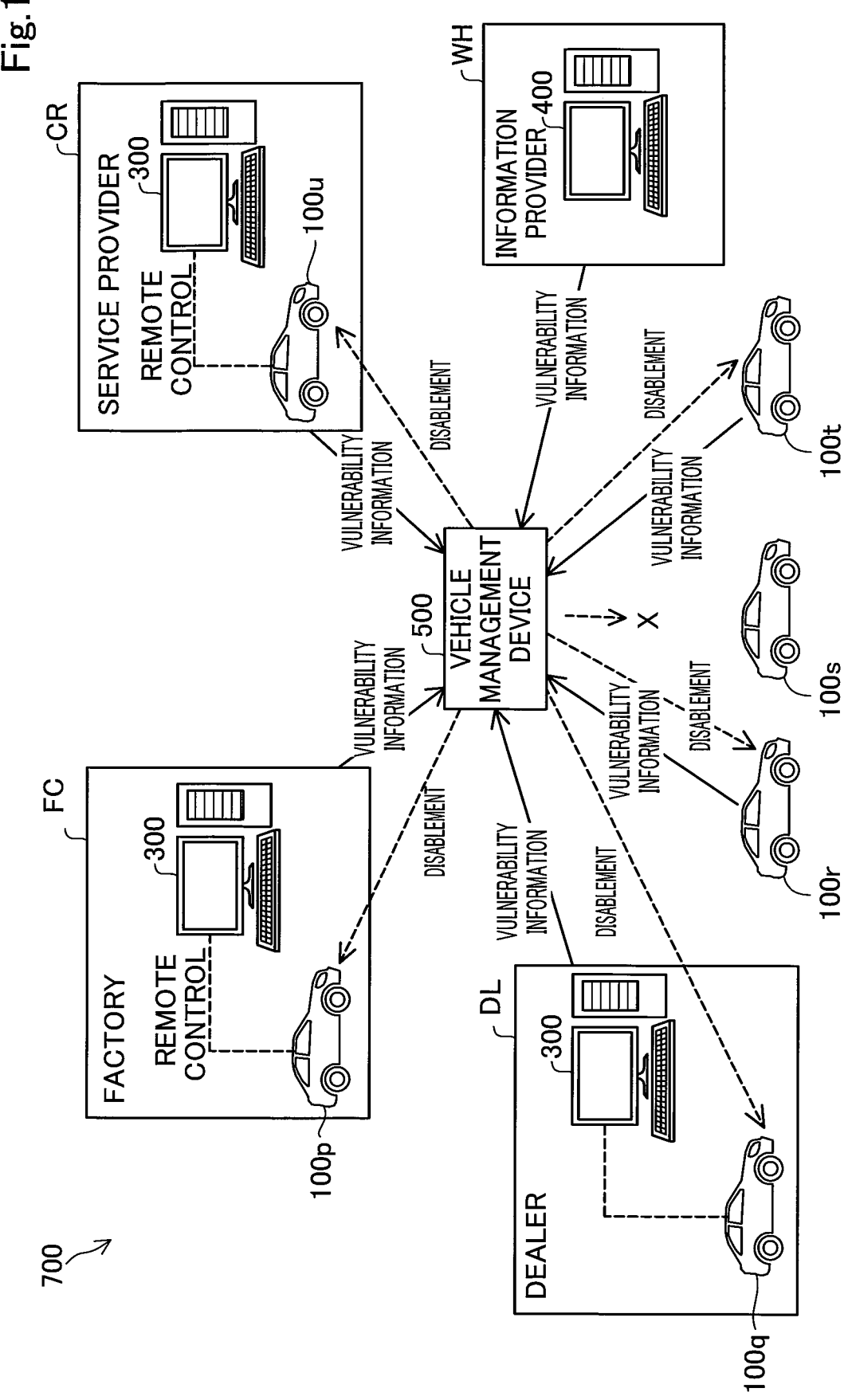
FIG. 1 is an explanatory view of a structure of a moving object management system according to a first embodiment.

FIG. 1 is an explanatory view of a structure of a moving object management system 700 according to the first embodiment. The moving object management system 700 includes a moving object management device 500 and a remote control device 300. The moving object management device 500 manages a moving object with a remote control function. The "remote control function" means a function that enables automatic movement of a moving object through remote control. The moving object management system 700 may be a remote driving system that manually operates running of a vehicle 100 by a remote operator.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate. In this specification, the term "vehicle" is a general term for a finished product, and a semi-finished or in-process product in the halfway of manufacturing. FIG. 1 shows vehicles 100p, 100q, 100r, 100s, 100t, and 100u as examples of the moving objects. In the following, the vehicles 100p, 100q, 100r, 100s, 100t, and 100u are collectively referred to as the "vehicle 100" when they are not distinguished from one another. Although the example in FIG. 1 shows a plurality of vehicles 100, the vehicle management device 500 may manage a single vehicle 100.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100.

Figure 2:
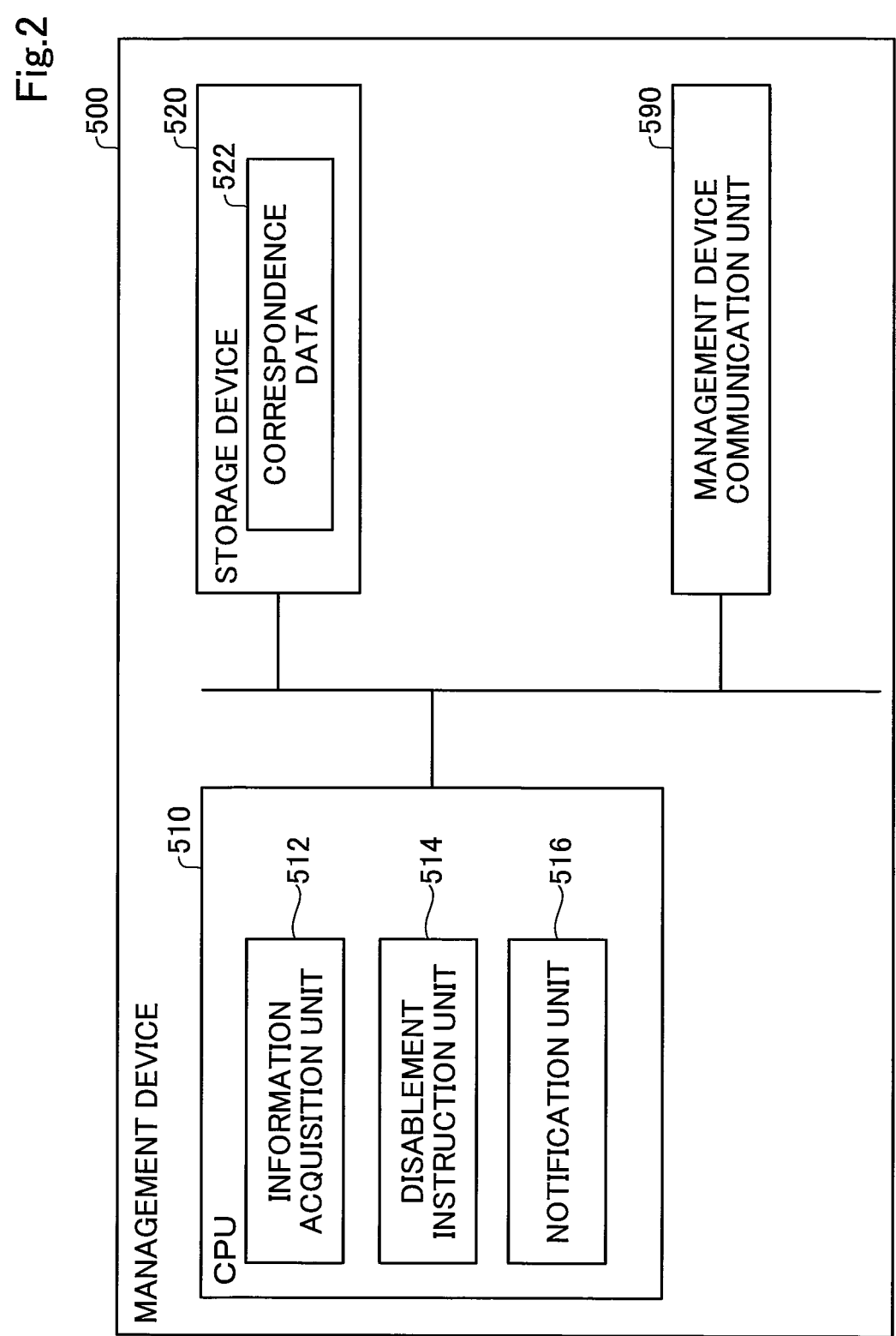
FIG. 2 is a block diagram of a functional structure of a vehicle management device according to the first embodiment.

FIG. 2 is a block diagram of a functional structure of the vehicle management device 500 according to the first embodiment. The vehicle management device 500 is equipped with a CPU 510 as a central processing unit, a storage device 520, and a management device communication unit 590, which are connected one another via an internal bus, interface circuitry, or the like. The management device communication unit 590 is a circuit for performing communication with the vehicle 100, the remote control device 300, an information provision device 400, and the like, via a network or the like.

The storage device 520 is, for example, RAM, ROM, HDD (hard disk drive), SSD (solid state drive), or the like. The storage device 520 functions as a correspondence data storage unit that stores correspondence data 522.

FIG. 3 is an explanatory view of an overview of the correspondence data 522. As shown in FIG. 3, the correspondence data 522 defines correspondence between the vehicle identification information of the vehicle 100 and the program information regarding the remote control function provided in the vehicle 100. The "vehicle identification information" refers to various types of information that enables individual identification of each vehicle 100. The vehicle identification information includes, for example, ID information given for each vehicle 100, such as VIN (Vehicle Identification Number), specification information of the vehicle 100, such as the vehicle type, color, and the shape, production control information of the vehicle 100, such as the name of the step in progress performed on the vehicle 100, and the like. The vehicle identification information can be acquired, for example, from RF-ID (Radio Frequency-Identification) tags attached to the vehicle 100, or the like, via short-range wireless communication or the like.

The "program information regarding the remote control function" refers to information regarding the programs in the operating system of computers and software that implement the remote control function, such as the version information of the remote control program. By referring to the correspondence data 522, the vehicle management device 500 is capable of, for example, managing the activation or disablement status of the remote control function of the vehicle 100, as well as program information regarding the remote control function of the vehicle 100, for each vehicle identification information. The correspondence data 522 may further include information regarding vulnerability of the remote control function, such as the "presence/absence of vulnerability" shown in FIG. 3. Further, the correspondence data 522 may further include information regarding the schedule for implementing remote control, such as information as to whether or not the owner of the vehicle 100 plans to perform automatic running of the vehicle 100 by remote control. The schedule for implementing remote control may be used, for example, to determine whether or not to disable the remote control.

Referring back to FIG. 2, the storage device 520 further stores various programs for implementing the functions provided in the present embodiment. The CPU 510 functions as an information acquisition unit 512, a disablement instruction unit 514, a notification unit 516, and the like, by executing the computer program stored in the storage device 520. However, some or all of these functions may be configured by hardware circuits.

The information acquisition unit 512 acquires vulnerability information regarding vulnerability of the remote control function. In the present embodiment, the information acquisition unit 512 acquires the vulnerability information from the remote control device 300, the information provision device 400, the vehicle 100, and the like, as shown in FIG. 1. The "vulnerability information" refers to information regarding vulnerability or possibilities of vulnerability of the remote control function, and the like. The vulnerability of the remote control function means, for example, a security flaw caused by a program defect or the like in the OS of the computer or software used to implement the remote control function. It is sufficient that the vulnerability information includes at least one of information regarding security holes in the remote control function, information regarding hacking of the remote control function, information regarding defects in the program regarding the remote control function, information regarding computer viruses that affect the remote control function, and information regarding distrust of the remote control function.

The "information regarding security holes in the remote control function" includes, for example, information regarding the presence or threat of security holes in the remote control program 224, information regarding the presence or threat of security holes in the programs, etc. in the ECU (Electronic Control Unit) or similar devices provided in the vehicle 100 used to realize the remote control function. The "information regarding hacking of the remote control function" includes information regarding, for example, the fact that the remote control programs or devices, etc. used to realize the remote control function have been hacked or are under the threat of hacking. The "information regarding flaws in the program regarding the remote control function" includes, for example, information of the presence or potential presence of program flaws in the remote control program, the ECU, or the like.

The "information regarding computer viruses that affect the remote control function" includes information regarding, for example, the fact that computer viruses that may affect the remote control programs or devices, etc. used to realize the remote control function have been found or that the remote control programs or the devices, etc. are under the threat of such viruses. The "information regarding distrust of the remote control function" includes, in addition to the information described above, information regarding growing distrust of the remote control function among the public, such as customers and general users, or the possibility of such distrust. The "information regarding distrust of the remote control function" may also include, for example, the fact that information that increases or may increase public distrust about the remote control function has been published by the mass media, such as newspapers and television.

The disablement instruction unit 514 instructs the vehicle 100 with vulnerability to disable the remote control function. Whether or not the vehicle 100 has vulnerability can be determined by using the vulnerability information. In the present embodiment, whether or not the vehicle 100 has vulnerability is determined manually, for example, by the user of the vehicle management device 500 or a predetermined worker who has acquired the vulnerability information. Further, whether or not the vehicle 100 has vulnerability is determined, for example, for each program information related to the remote control function. In the present embodiment, the disablement instruction unit 514 refers to the correspondence data 522 and extracts the vehicle 100 having the vehicle identification information associated with the program information that is determined to have vulnerability as the vehicle 100 having vulnerability. The disablement instruction unit 514 does not disable the remote control function of the vehicle 100 that does not have vulnerability due to, for example, differences in version information of the remote control program, such as the vehicle 100s shown in FIG. 1.

The notification unit 516 gives notifications to the extracted vehicle 100 having vulnerability. More specifically, the notification unit 516 gives a notification that prompts actions with regard to the disablement of the remote control function or actions to eliminate the vulnerability of the remote control function.

Referring back to FIG. 1, the remote control device 300 performs automatic running of the vehicle 100 by remote control. The remote control device 300 is provided, for example, at each site where the remote control of the vehicle 100 is performed. Examples of the sites where the remote control is performed include a factory FC where the vehicle 100p is manufactured, a dealer DL that sells the vehicle 100q, and a service provider CR that uses the vehicle 100u to provide services.

In the factory FC, the remote control device 300 transports the vehicle 100p using automatic running by remote control, for example, during the manufacturing process for producing the vehicle 100p. The transportation of the vehicle 100p using automatic running by remote control is also referred to as a "remote control auto driving system". By the remote control auto driving system of the vehicle 100p, it is possible to inhibit or prevent human-caused accidents during running of the vehicle 100p. At the dealer DL, the automatic running of the vehicle 100q by remote control is provided for automatic parking in the parking lot in the dealer DL and for demonstrations to the customers. At the service provider CR, the automatic running of the vehicle 100u by remote control is provided to businesses such as MaaS (Mobility as a Service) business.

The remote control device 300 is communicatively connected to the vehicle management device 500. The remote control device 300 can provide the vulnerability information acquired for each site to the vehicle management device 500. In the present embodiment, vulnerability or possibilities of vulnerability of the remote control function is identified for each site by the user, the administrator, or the like of the remote control device 300, and is manually provided to the vehicle management device 500 by them. By collecting the vulnerability information for each site, the vulnerability information can be efficiently acquired for a plurality of vehicles 100 subjected to the management by the vehicle management device 500.

In the present embodiment, the vehicle management system 700 further includes the information provision device 400. The information provision device 400 is communicatively connected to the vehicle management device 500. The information provision device 400 is used by an information provider WH to acquire the vulnerability information from the information provider WH. The information provider WH is, for example, a white hat hacker. The information provider WH provides the vulnerability information acquired by analyzing the remote control program of the vehicle 100 to the vehicle management device 500 via the information provision device 400. The structure of the information provision device 400 is the same as that of the remote control device 300, except that the information provision device 400 does not have a remote control function; therefore, a detailed description thereof is omitted.

The vulnerability information may also be provided from the vehicles 100 supplied to the general users, etc., such as the vehicles 100r, 100s, 100t, and the like. For example, the vehicle 100 detects such as unauthorized access to the ECU installed in the vehicle 100, as the vulnerability information. The vehicle 100 that has detected the vulnerability information provides the vulnerability information to the vehicle management device 500 via a communication device dedicated to the vehicle 100, or a similar device.

Figure 4:
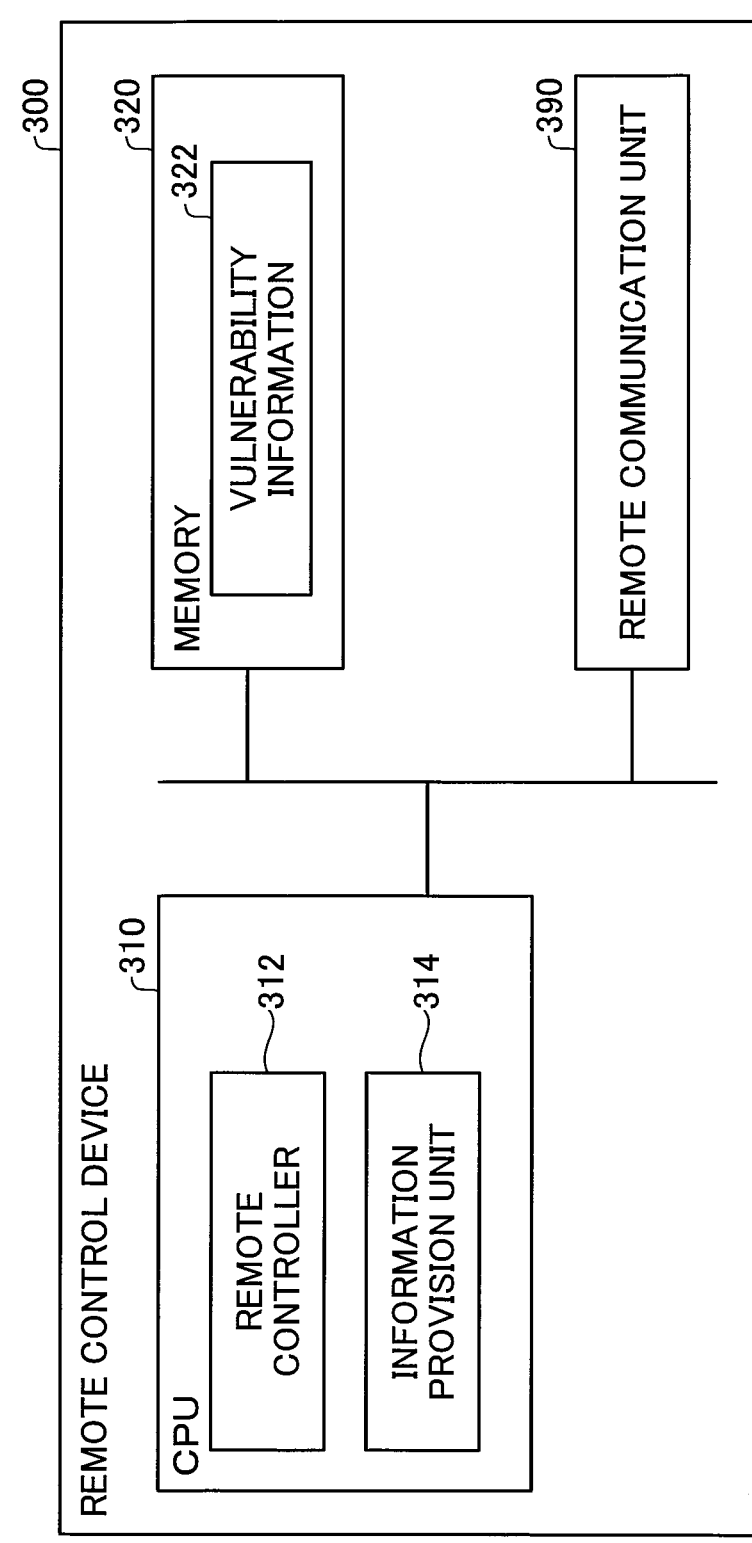
FIG. 4 is a block diagram of a functional structure of a remote control device.

FIG. 4 is a block diagram of a functional structure of the remote control device 300. The remote control device 300 is provided with a CPU 310 as a central processing unit, a storage device 320, and a remote communication unit 390, which are connected one another via an internal bus, interface circuitry, or the like. The remote communication unit 390 is a circuit for performing communication with the vehicle management device 500, the vehicle 100, other remote control devices 300, the information provision device 400, and the like, via a network or the like.

The storage device 320 is, for example, RAM, ROM, HDD (hard disk drive), SSD (solid state drive), or the like. Vulnerability information 322 that has been acquired can be stored in the readable/writable area of the storage device 320. The storage device 320 further stores various programs for implementing the functions provided in the present embodiment. The CPU 310 functions as a remote controller 312, an information provision unit 314, and the like, by executing the computer program stored in the storage device 320. However, some or all of these functions may be configured by hardware circuits.

The remote controller 312 performs automatic running of the vehicle 100 by remote control. More specifically, the remote controller 312 transmits a control signal for requesting the remote control to the vehicle 100 via the remote communication unit 390. When the vehicle 100 receives the request for remote control, the ECU of the vehicle 100 implements driving control according to the control signal, thereby enabling automatic running of the vehicle 100. The information provision unit 314 provides the acquired vulnerability information 322 to the vehicle management device 500 or the like.

Figure 5:
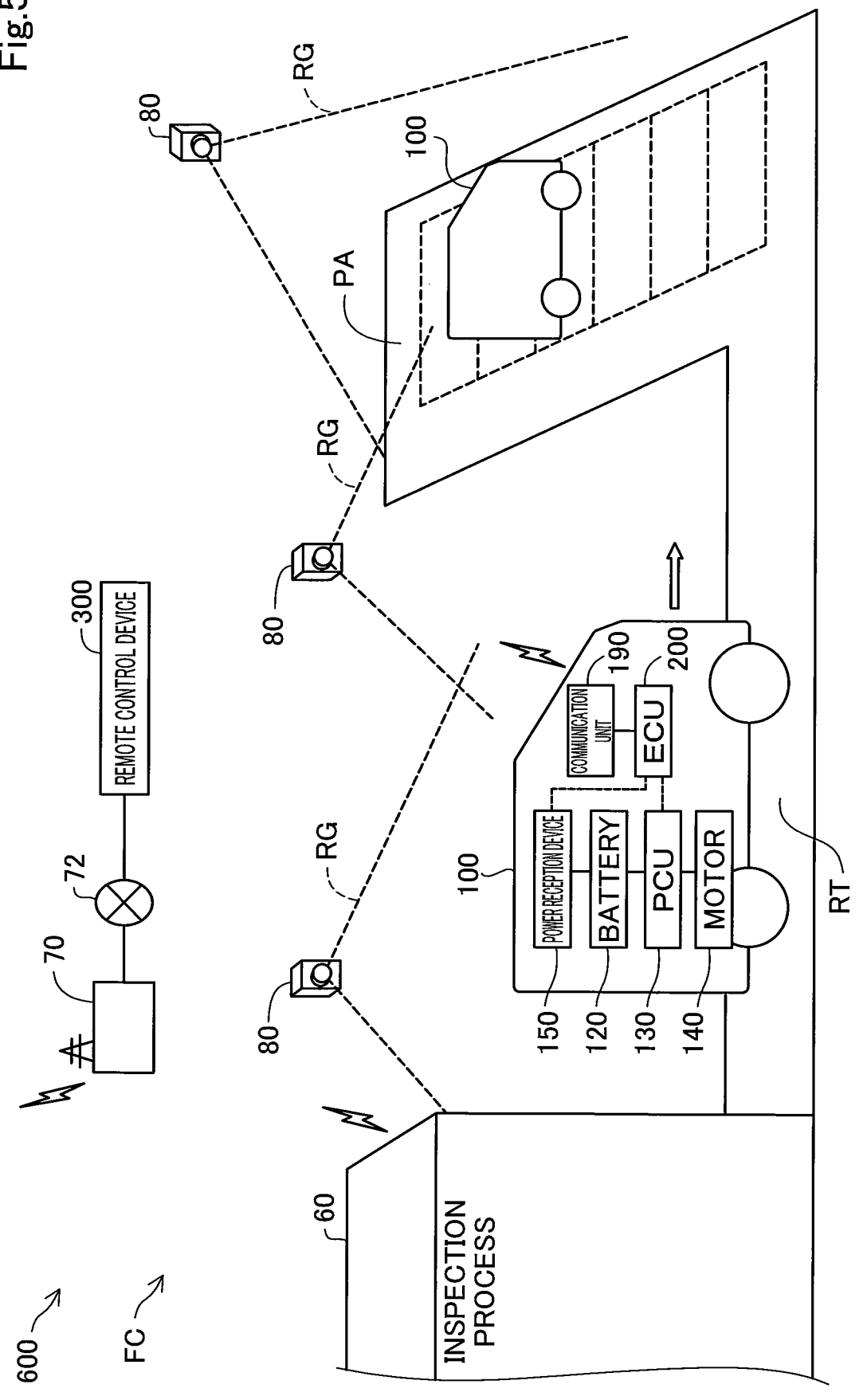
FIG. 5 is an explanatory view of an overview of automatic running of a vehicle by remote control of a remote automatic driving system.

FIG. 5 is an explanatory view of an overview of automatic running of the vehicle 100 by remote control of the remote automatic driving system 600 including the remote control device 300. FIG. 5 schematically shows the remote automatic driving system 600 in the factory FC, which is one of the sites shown in FIG. 1. The factory FC has a manufacturing process for manufacturing the vehicle 100, a track RT on which the vehicle 100 can run, and a parking lot PA. The manufacturing process of the vehicle 100 includes an inspection step 60 and an assembly step (not shown). The assembly step is, for example, a step of assembling parts onto the vehicle body. The track RT may include, for example, a transport section for the vehicle 100 connecting the steps, and a transport section for the vehicle 100 connecting the inspection step 60 to the parking lot PA. After the vehicle 100 undergoes the inspection step 60, it is completed as a product. The vehicle 100 then automatically runs to the parking lot PA by remote control of the remote automatic driving system 600.

The vehicle 100 is equipped with a vehicle communication unit 190, a power reception device 150, a battery 120, a PCU 130, a motor 140, and an ECU 200. The vehicle communication unit 190 is a wireless communication device mounted on the vehicle 100, such as a dongle, for example. The vehicle communication unit 190 has a communication function that enables communication using CAN (Controller Area Network) communication, which can be used for controlling the vehicle 100, and diagnosis communication, which can be used for diagnosis of malfunctions. The CAN communication is a communication standard that allows transmission and reception in multiple directions. The diagnosis communication is a communication standard that allows one-to-one correspondence between requests and responses. The vehicle communication unit 190 performs wireless communication with devices outside the vehicle 100, such as the moving object management device 500, the remote control device 300 connected to a network 72, for example, via an access point 70 in the factory FC.

The power reception device 150 converts AC power supplied from an external power feeder or the like into DC power using a rectifier, and supplies the resulting DC power to the battery 120 as a load. The battery 120 is a rechargeable secondary battery, such as a lithium-ion battery, a nickel-metal hydride battery, or the like. The battery 120 is a high-voltage battery of, for example, several hundreds volts, and stores electric power to be used for the running of the vehicle 100. The electric power supplied to the power reception device 150 from an external power feeder, and the regenerative power generated by the motor 140 are supplied to the battery 120 to charge the battery 120.

The motor 140 is, for example, an AC synchronous motor, and functions as an electric motor and a power generator. When the motor 140 functions as an electric motor, the motor 140 is driven by, as a power source, electric power stored in the battery 120. The output of the motor 140 is transmitted to the wheels via a reduction gear and axles. Upon lowering the speed of the vehicle 100, the motor 140 functions as a power generator using the rotation of the wheels, and generates regenerative power. The PCU (Power Control Unit) 130 is electrically connected between the motor 140 and the battery 120. The PCU 130 is controlled by the ECU 200 to control the delivery and acceptance of the electric power between the battery 120 and the motor 140.

FIG. 6 is a block diagram of an internal functional structure of the ECU 200. The ECU 200 is mounted on the vehicle 100 and performs various types of control of the vehicle 100. The ECU 200 is equipped with HDD (hard disk drive), SSD (solid state drive), an optical storage medium, a storage device 220 such as a semiconductor memory or the like, and a CPU 210 as a central processing unit.

The storage device 220 stores an implementation condition 222. The implementation condition 222 is a condition for allowing a disablement implementation unit 214 to perform the disablement/invalidation process. The implementation condition 222 is used after a disablement instruction from the disablement instruction unit 514 is detected. Specifically, the disablement implementation unit 214 performs the disablement process when the implementation condition 222 is satisfied after the disablement instruction is detected. In the present embodiment, the implementation condition 222 is the fact that the vehicle 100 has been stopped. The disablement implementation unit 214 may perform the disablement process when the disablement instruction is detected without using the implementation condition 222.

The storage device 220 stores various programs to implement the functions provided in the present embodiment. As the CPU 210 performs various computer programs stored in the storage device 220, various functions, such as the disablement implementation unit 214 and the driving control unit 212, are implemented. For example, the remote control program 224 shown in FIG. 6 is a computer program that allows the CPU 210 to implement the function as the driving control unit 212. The remote control program 224 includes program information 225 regarding the remote control function, including version information of the remote control program 224. The program information 225 may vary depending on the shipping destination, such as so-called the destination country, of the vehicle 100, the vehicle type of the vehicle 100, the devices and parts to be mounted on the vehicle 100, the specifications of the vehicle 100, and the like. In this case, whether or not the vehicle 100 has vulnerability is different for each vehicle 100.

The driving control unit 212 performs driving control of the vehicle 100. The "driving control" includes adjustment of acceleration, speed, and steering angle. In the driving control by remote control, the driving control unit 212 controls each actuator mounted on the vehicle 100 according to the request for remote control received from the remote control device 300 via the vehicle communication unit 190.

The disablement implementation unit 214 performs the disablement process to disable the driving control of the vehicle 100 by remote control. The "disablement of driving control by remote control" means loss of the function of executing driving control in accordance with the request for remote control, from among the functions of the driving control unit 212. The disablement implementation unit 214 performs the disablement process when it receives an instruction to perform the disablement process from the disablement instruction unit 514 of the moving object management device 500, and, in addition to this, when the implementation condition 222 is satisfied if the implementation condition 222 is designated. When the disablement process by the disablement implementation unit 214 is performed, the driving control unit 212 changes the state to a state in which the request for remote control is disabled. By disabling the driving control by remote control, it is possible to prevent such as running of the vehicle 100 by unauthorized remote control by a third party.

The disablement of the remote control includes reversible disablement in which the disabled remote control can be restored to a valid state if a predetermined condition is satisfied, and irreversible disablement that does not allow any restoration. The reversible disablement can be achieved, for example, by encrypting the program responsible for the function of executing the driving control according to the remote control among the functions of the driving control unit 212, and making it decodable only by a person with a predetermined authority. The irreversible disablement can be achieved, for example, by deleting the program responsible for the function of executing the driving control according to the remote control, or by physically disconnecting the connection with the program or hardware, etc. having the function. In view of security enhancement, the irreversible disablement is preferable if the remote control will not be performed in the future. Further, even if the remote control will be performed in the future, the irreversible disablement is preferable for the period until the remote control is performed. In the present embodiment, the disablement implementation unit 214 performs the irreversible disablement as the disablement process. However, the disablement implementation unit 214 may also perform the reversible disablement. In view of security enhancement, the ECU 200 is preferably further equipped with a secure microcontroller with FPGA (Field Programmable Gate Array), flash memory and the like, HSM (Hardware Security Module), and the like.

Referring back to FIG. 5, the remote automatic driving system 600 is equipped with a vehicle detector and the remote control device 300. The vehicle detector detects vehicle information, which includes at least one of an image of the vehicle 100 and the position of the vehicle 100. The detected vehicle information is used for remote control by the remote automatic driving system 600. The "vehicle information" may also include the running direction of the vehicle 100 or the orientation of the vehicle 100. The running direction of the vehicle 100 and the orientation of the vehicle 100 can be acquired, for example, by detecting the shape of the vehicle 100, the parts of the vehicle 100, and the like. However, it is also possible to acquire only the position of the vehicle 100 by the vehicle detector, and the running direction and orientation of the vehicle 100 may be presumed by using changes in the vehicle 100 over time.

In the present embodiment, a camera 80 is used as the vehicle detector. The camera 80 is communicatively connected to the remote control device 300 by wireless or wired communication. The camera 80 has an imaging unit, such as a CCD (Charge Coupled Device) image sensor or CMOS (Complementary Metal Oxide Semiconductor) image sensor, and an optical system.

The camera 80 is fixed to a position where images of the track RT and the vehicle 100 running on the track RT can be captured, and captures images of the vehicle 100 as the vehicle information. In the example of FIG. 5, the camera 80 acquires a bird's-eye view image of the vehicle 100 on the track RT and in the parking lot PA from above. The number of the cameras 80 is set in consideration of the angles of view of the cameras 80 and the like so that the entire track RT and parking lot PA can be captured. By performing image analysis, the images acquired by the camera 80 can be used to acquire various types of vehicle information, such as the position of the vehicle 100 relative to the track RT, the orientation of the vehicle 100, and the like, which can be used for remote control. By using the images captured by the camera 80 installed in the factory FC, automatic running of the vehicle 100 can be performed by remote control without using a detector mounted on the vehicle 100, such as a camera, a millimeter wave radar, LiDAR (Light Detection And Ranging), and the like. However, it is possible to supplementally use a detector mounted on the vehicle 100 to prevent collisions during the remote control, or the like. The vehicle detector does not have to acquire images of the vehicle 100, as long as it is capable of acquiring the location of the vehicle 100. In this case, various types of vehicle detector capable of detecting the position of the vehicle 100, instead of the image of the vehicle 100, may be used; examples include LiDAR, infrared sensors, laser sensors, ultrasonic sensors, millimeter wave radars, and the like.

On the track RT, a reference running route on which the vehicle 100 is supposed to run by remote control is set in advance. The remote controller 312 acquires images of the track RT and the vehicle 100 captured by the camera 80 via wireless communication with the vehicle 100 via the access point 70. The remote controller 312 causes the ECU 200 to perform driving control of the vehicle 100 while analyzing the acquired images at predetermined time intervals. The remote controller 312 successively adjusts the position of the vehicle 100 relative to the reference route upon the request for remote control with respect to the vehicle 100, thereby allowing the vehicle 100 to run along the reference route. Further, the remote controller 312 is also capable of parking the vehicle 100 in a parking position in the parking lot PA by remote control.

Figure 7:
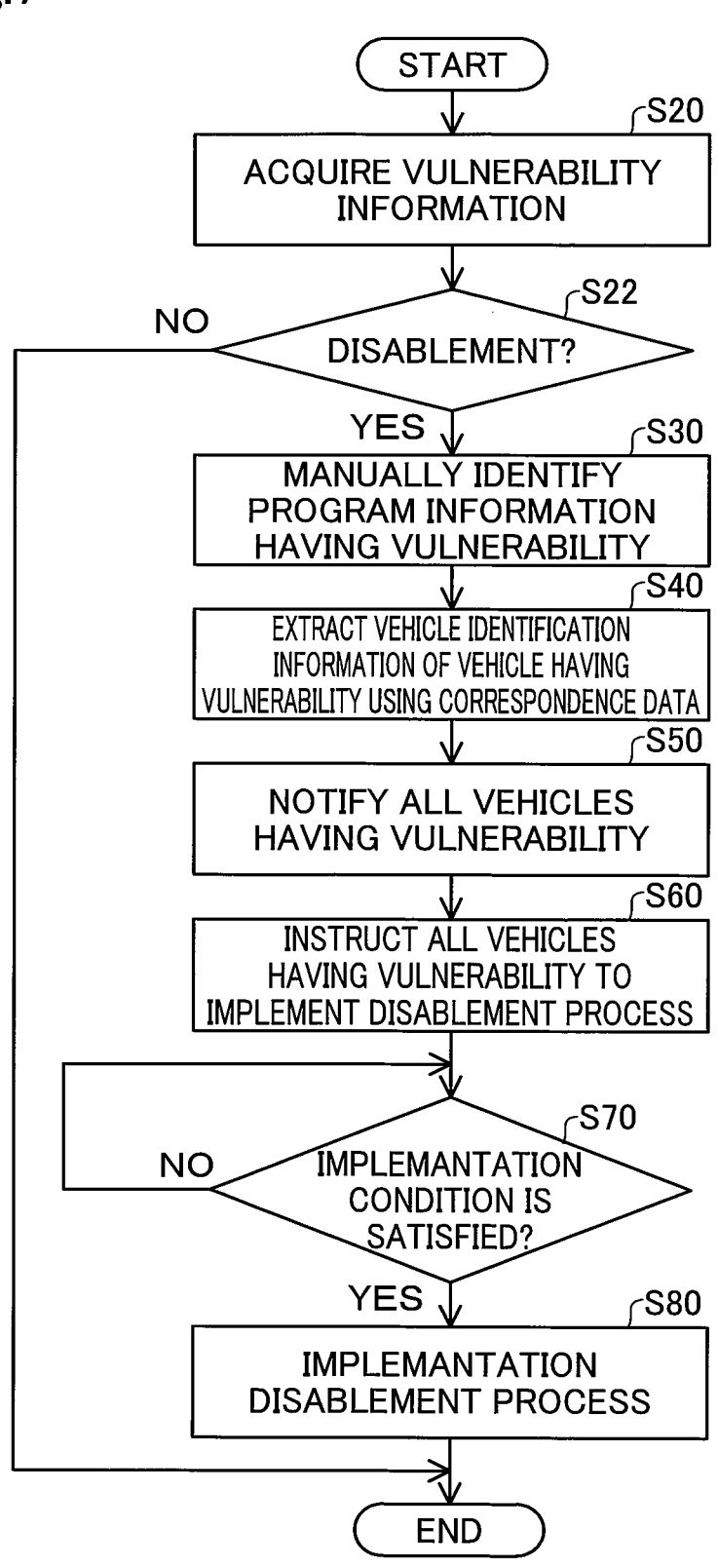
FIG. 7 is a flowchart of a remote control disablement method according to the first embodiment.

FIG. 7 is a flowchart of a remote control disablement method according to the first embodiment. This flow is initiated, for example, by the activation of the vehicle management device 500.

In the step S20, the information acquisition unit 512 acquires the vulnerability information from the reports from the vehicle 100, the remote control device 300, the information provision device 400, and the like. In the step S22, the user, etc. of the vehicle management device 500 analyzes the acquired vulnerability information to determine whether or not to disable the remote control function. The determination as to whether or not to disable the remote control function is made based on the presence/absence of threat on the remote control of the vehicle 100 in the acquired vulnerability information, or based on the degree of such a threat. If it is determined that the remote control function is not to be disabled (S22: NO), the disablement instruction unit 514 ends the flow. As a result, the remote control function of the vehicle 100 is not disabled. If the determination to disable the remote control function is made (S22: YES), the disablement instruction unit 514 forwards the process to the step S30.

In the step S30, the program information 225 having vulnerability is identified from among the remote control program 224. Identifying the program information 225 means, for example, identifying a vulnerable version of the remote control program 224 from among the remote control program 224. In the present embodiment, the identification of the program information 225 is performed manually by a user, etc. of the vehicle management device 500. The identification of the program information 225 may also be performed by the user, etc. of the remote control device 300, the information provision device 400, or by the vehicle 100. In this case, the step S30 can be omitted.

In the step S40, the disablement instruction unit 514 refers to the correspondence data 522 and extracts the vehicle 100 having vulnerability from the vehicle identification information associated with the identified program information 225. Specifically, the disablement instruction unit 514 extracts all vehicles 100 having the identified program information 225. In the example of the correspondence data 522 shown in FIG. 3, the vehicles 100 corresponding to the vehicle identification information ID1 and ID2 having the program information 225 of version V1, which has been determined to be vulnerable, are extracted as the vehicles 100 having vulnerability.

In the step S50, the notification unit 516 gives a notification that prompts actions with regard to the disablement of the remote control function or actions to eliminate the vulnerability of the remote control function. The notification unit 516 gives such a notification to the driver, etc. of the vehicle 100, for example, by means of a screen display via a display provided in the vehicle 100 or by voice through an audio system or the like provided in the vehicle 100. The notification unit 516 may give, for example, a notification that prompts transport of the vehicle 100 to a site such as the dealer DL, etc., a notification that prompts update of the software of the remote control program 224 or the ECU 200, etc., a notification to inform that the remote control function will be disabled, and the like. The notification unit 516 may give a notification not only to the driver of the vehicle 100, but also to the administrator of the vehicle 100, the administrator of the site such as the dealer DL, or to the remote control device 300.

In the step S60, the disablement instruction unit 514 transmits a command signal to perform the disablement process to all vehicles 100 having vehicle identification information that have been determined to have vulnerability. In the step S70, in response to reception of the command signal to perform the disablement process, the disablement implementation unit 214 waits for the implementation condition 222 to be satisfied. In the present embodiment, the implementation condition 222 is the fact that the vehicle 100 has been stopped. The state in which "the vehicle 100 has been stopped" includes turning off the ignition of the vehicle 100, turning off the power of the vehicle 100, stopping or parking the vehicle 100, and the like. The stopping of the vehicle 100 includes both the stopping of the vehicle 100 that is running by automatic running by remote control and the stopping of the vehicle 100 that is running manually.

If the vehicle 100 has not been stopped (S70: NO), the disablement implementation unit 214 waits for the vehicle 100 to stop. If the vehicle 100 has been stopped (S70: YES), the disablement implementation unit 214 forwards the process to the step S80. In the step S80, the disablement implementation unit 214 performs the disablement process to irreversibly disable the remote control function, and ends the flow. In the example in FIG. 5, when the command signal for executing the disablement process is received while the vehicle 100 is running, the disablement process is performed at the timing when the vehicle 100 is parked in the parking lot PA. The vehicle 100 in which the remote control function has been disabled can restore the remote control function by update of the remote control program 224 or the software of the ECU 200, etc., by the site such as the dealer DL, etc., by update to a software provided from the vehicle management device 500, or by replacing the hardware of the ECU 200, etc.

As described above, the vehicle management device 500 of the present embodiment has the information acquisition unit 512 for acquiring the vulnerability information regarding vulnerabilities of the remote control function, and the disablement instruction unit 514 for instructing the vehicle 100 having vulnerability that has been extracted using the vulnerability information to disable the remote control function. Based on the acquired vulnerability information, the remote control function of the vehicle 100 having vulnerability can be disabled, thereby inhibiting or preventing misuse of the remote control function of the vehicle 100 after the shipment.

The vehicle management device 500 of the present embodiment further includes a correspondence data storage unit that stores correspondence data 522 between the identification information of the vehicle 100 and the program information 225 regarding the remote control function provided in the vehicle 100. When the program information 225 having vulnerability is identified, the disablement instruction unit 514 extracts all vehicle identification information corresponding to a plurality of vehicles 100 having the identified program information 225 using the stored correspondence data 522. The disablement instruction unit 514 instructs all vehicles 100 corresponding to the extracted identification information to disable the remote control function. The plurality of vehicles 100 having vulnerability can be identified by such a simple process of using the correspondence data 522. Further, it is also possible to disable the remote control functions of the plurality of identified vehicles 100 at once.

The vehicle management device 500 of the present embodiment further includes the notification unit 516. The notification unit 516 gives a notification to the extracted vehicle 100 having vulnerability to prompt implementation of disablement of the remote control function as well as implementation of actions to eliminate the vulnerability. By thus prompting the implementations of the disablement of the remote control function and the actions to eliminate the vulnerability, the risk caused by the vulnerability of the remote control function can be eliminated rapidly.

The vehicle management device 500 of the present embodiment further includes the disablement implementation unit 214. The disablement implementation unit 214 performs the disablement process to disable the remote control function when, after the reception of the instruction to disable the remote control function, the predetermined implementation condition 222 is satisfied. The timing when the remote control function is disabled can be set to the timing at which the implementation condition 222 is satisfied.

According to the vehicle management device 500 of the present embodiment, the implementation condition 222 is that the vehicle 100 that has received the instruction to disable the remote control function has been stopped. By establishing the implementation condition 222 while the vehicle 100 is stopped, it is possible to inhibit or prevent the implementation of the disablement process during the running of the vehicle 100 by remote control.

The vehicle management device 500 of the present embodiment manages the vehicle 100p capable of running by remote control in the factory FC during the manufacturing process in the factory FC where the vehicle 100 is manufactured. This inhibits or prevents misuse of the remote control function of the vehicle 100 during the manufacturing.

B. Second Embodiment

Figure 8:
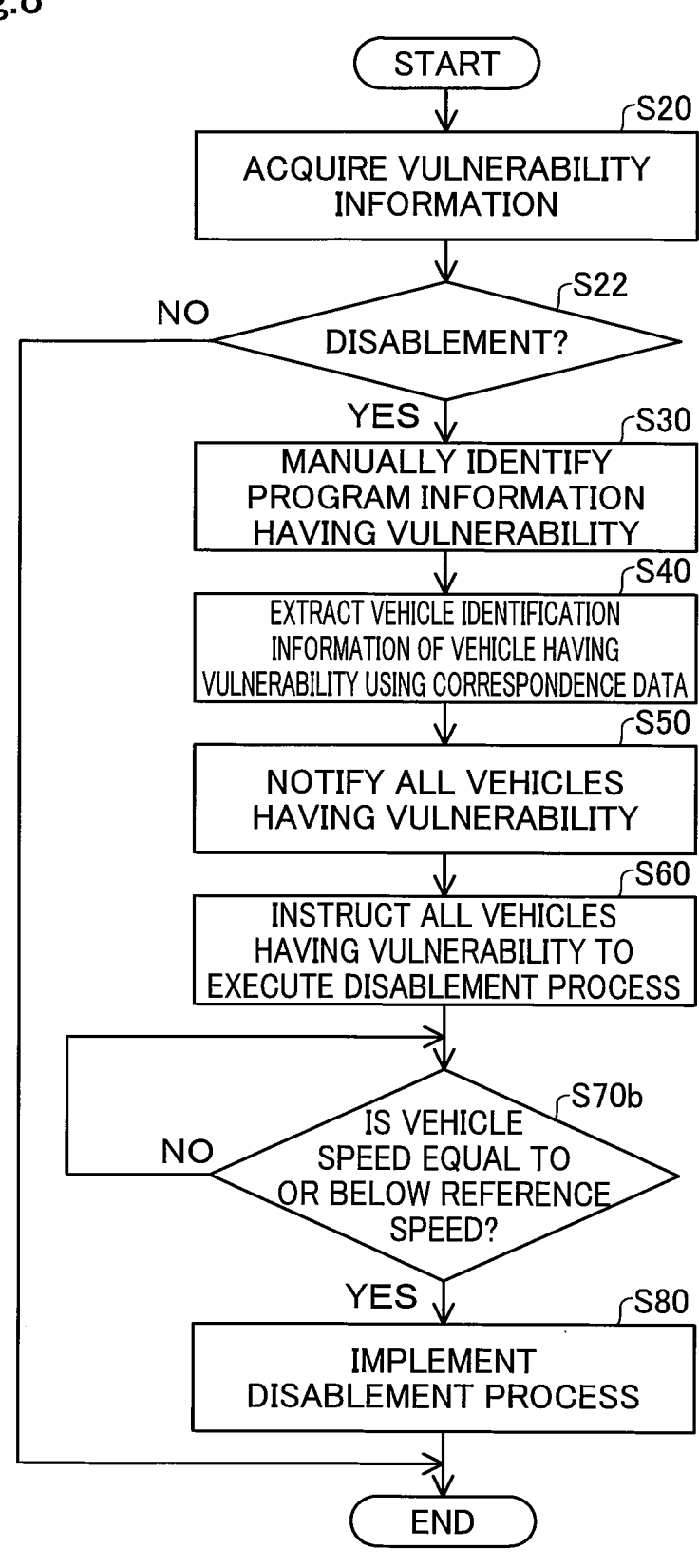
FIG. 8 is a flowchart of a remote control disablement method according to a second embodiment.

FIG. 8 is a flowchart of a remote control disablement method according to the second embodiment. The remote control disablement method according to the second embodiment differs from that of the first embodiment in that it has the step S70b instead of the step S70, and otherwise is similar to the first embodiment in its structure. The content of the implementation condition 222 in the step S70b is different from that in the step S70.

The first embodiment shows an example in which the implementation condition 222 is stopping of the vehicle 100. In contrast, in the present embodiment, the implementation condition 222 is set to a state in which the running speed, i.e., the vehicle speed, of the vehicle 100 that has received the instruction to disable the remote control function falls to or below a predetermined reference speed. The reference speed can be arbitrarily set. The reference speed can be set to a speed slower than, for example, the cruise speed or average speed during the automatic running of the vehicle 100 by remote control. The reference speed may be, for example, a speed at which the vehicle 100 with its remote control disabled can safely stop. According to the remote control disablement method of the present embodiment, for example, the vehicle 100 can be safely stopped even if the command signal for disablement is received while the vehicle 100 is in the process of remote control auto driving system.

C. Third Embodiment

Figure 9:
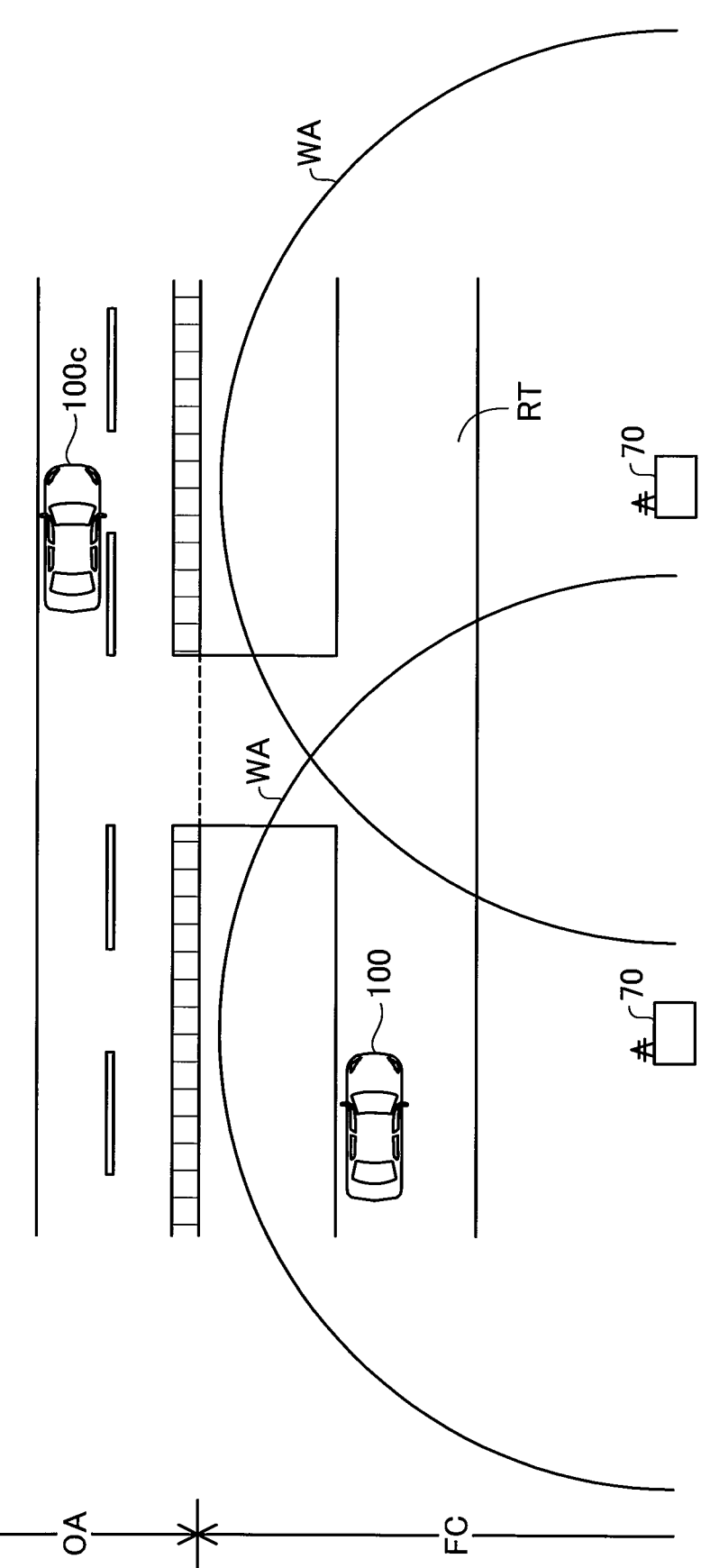
FIG. 9 is an explanatory view of a structure of implementation condition used for a remote control disablement method according to a third embodiment.

FIG. 9 is an explanatory view of a structure of the implementation condition 222 used for a remote control disablement method according to the third embodiment. In the present embodiment, the implementation condition 222 is set to a state in which the radio waves for remote control that have been detected by the vehicle 100 that has received the instruction to disable the remote control function are no longer detected.

As shown in FIG. 9, each of the plurality of access points 70 used for the remote control forms a communication area WA where wireless communication is possible. The communication area WA is configured to include, for example, the track RT on which the vehicle 100 automatically runs by remote control in a site such as the factory FC. In contrast, no communication area WA is provided in an area OA outside the factory FC.

In the example in FIG. 9, the vehicle 100 receives radio waves for wireless communication from the access point 70 when it automatically runs by remote control on the track RT in the factory FC. Therefore, in this case, the implementation condition 222 is not satisfied. In contrast, as shown in the vehicle 100c in FIG. 9, when the vehicle 100c moves from the factory FC to the area OA, for example, by manual running or the like, the vehicle 100c goes outside the communication area WA. As a result, the radio waves for wireless communication that have been detected by the vehicle communication unit 190 of the vehicle 100 are no longer detected, and the implementation condition 222 is satisfied.

As described above, according to the vehicle management device 500 of the present embodiment, the implementation condition 222 is satisfied when the radio waves for remote control which have been detected by the vehicle 100 that has received the instruction to disable the remote control function are no longer detected. Therefore, the radio waves for wireless communication used for the remote control of the vehicle 100 can be used for the implementation condition 222 as so-called geofencing.

D. Fourth Embodiment

Figure 10:
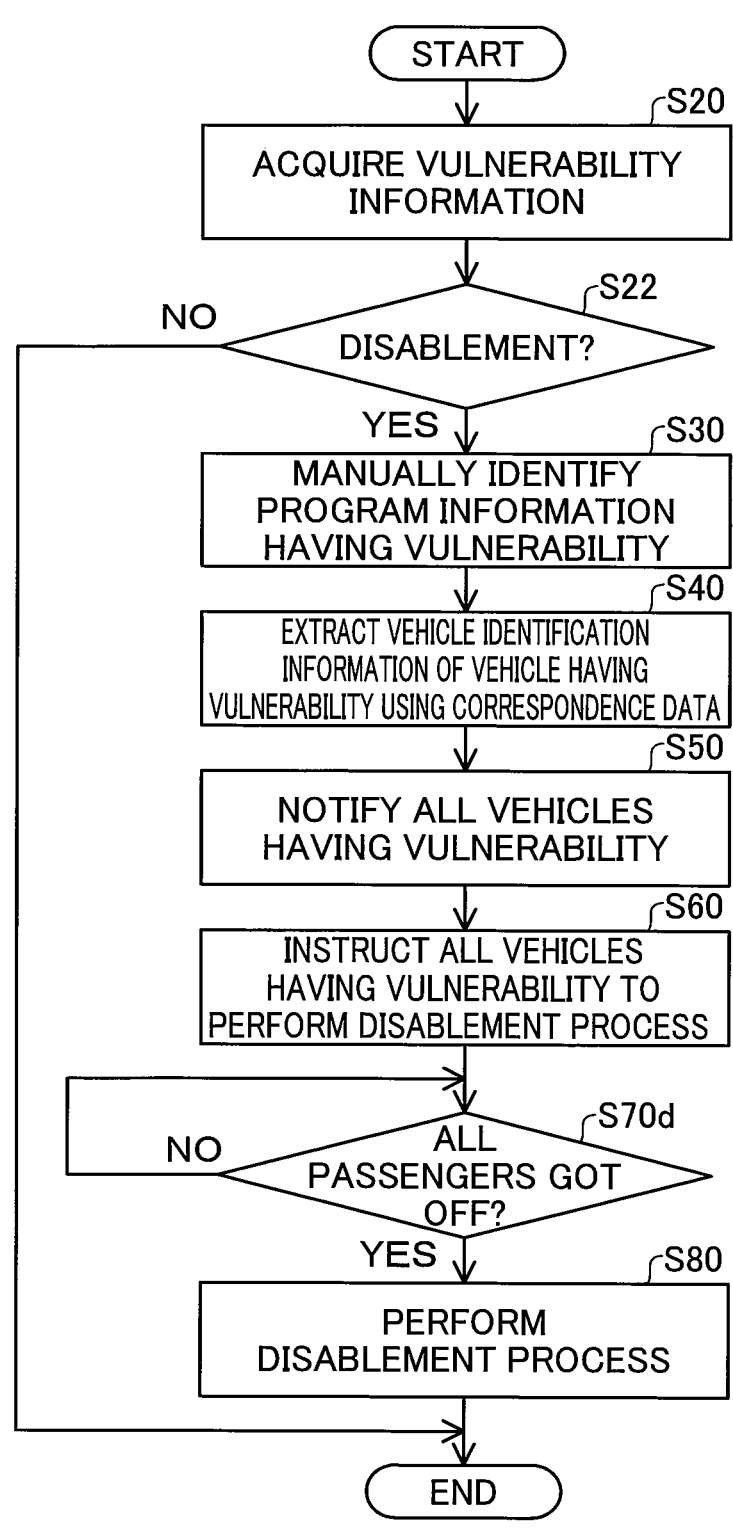
FIG. 10 is a flowchart of a remote control disablement method according to a fourth embodiment.

FIG. 10 is a flowchart of a remote control disablement method according to the fourth embodiment. The remote control disablement method according to the fourth embodiment differs from that of the first embodiment in that it has the step S70d instead of the step S70, and otherwise is similar to the first embodiment in its structure. The content of the implementation condition 222 in the step S70d is different from that in the step S70.

In the present embodiment, the implementation condition 222 is that all passengers on board the vehicle 100 which has received the instruction to disable the remote control function have gotten off the vehicle 100. The number of the passengers on board the vehicle 100 can be detected or counted using a sensor or other devices provided in the vehicle 100. According to the remote control disablement method thus structured, it is possible to inhibit or prevent the disablement of the remote control while the passengers are still on board the vehicle 100 under automatic running by remote control.

E. Fifth Embodiment

Figure 11:
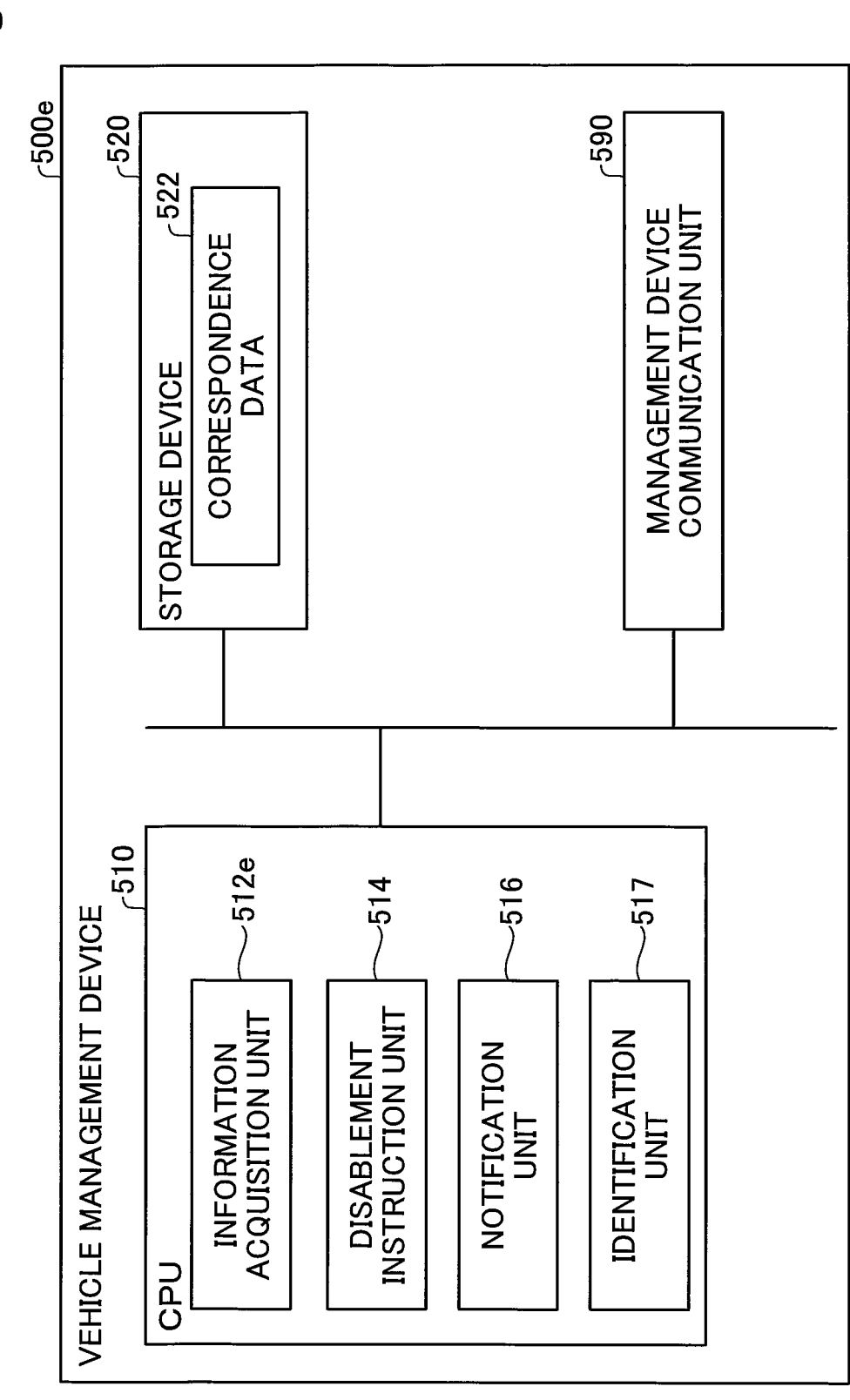
FIG. 11 is a block diagram of a functional structure of a vehicle management device according to a fifth embodiment.

FIG. 11 is a block diagram of a functional structure of a vehicle management device 500e according to the fifth embodiment. The vehicle management device 500e of the present embodiment differs from the vehicle management device 500 of the first embodiment in that the CPU 510 functions as an information acquisition unit 512e instead of the information acquisition unit 512 and further functions as an identification unit 517, and is otherwise similar to the vehicle management device 500 of the first embodiment in its structure.

The information acquisition unit 512e has a function of, as in each of the embodiments described above, acquiring the vulnerability information from the reports from the vehicle 100, the remote control device 300, the information provision device 400, and the like. Further, the information acquisition unit 512e also has a crawler function and a web scraper function to acquire the vulnerability information by patrolling and analyzing websites and SNS (Social Networking Service) on the Internet.

The identification unit 517 analyzes the acquired vulnerability information and determines whether or not to perform the disablement. Whether or not to disable the remote control function can be determined, for example, by referring to the criteria stored in advance in the storage device 520. For example, the criteria defines the correspondence between the vulnerability information and the presence or absence of a threat to the remote control of the vehicle 100, or the degree of such a threat. When the identification unit 517 determines that the acquired vulnerability information is the one that poses a threat to the remote control, that the degree of the threat is greater than the reference value, or in some similar cases, the identification unit 517 determines to disable the remote control function. When the identification unit 517 determines to disable the remote control function, the identification unit 517 identifies the program information 225 having vulnerability. The determination to disable or not to disable the remote control function may be made manually by a worker or the like who confirmed the acquired vulnerability information.

Figure 12:
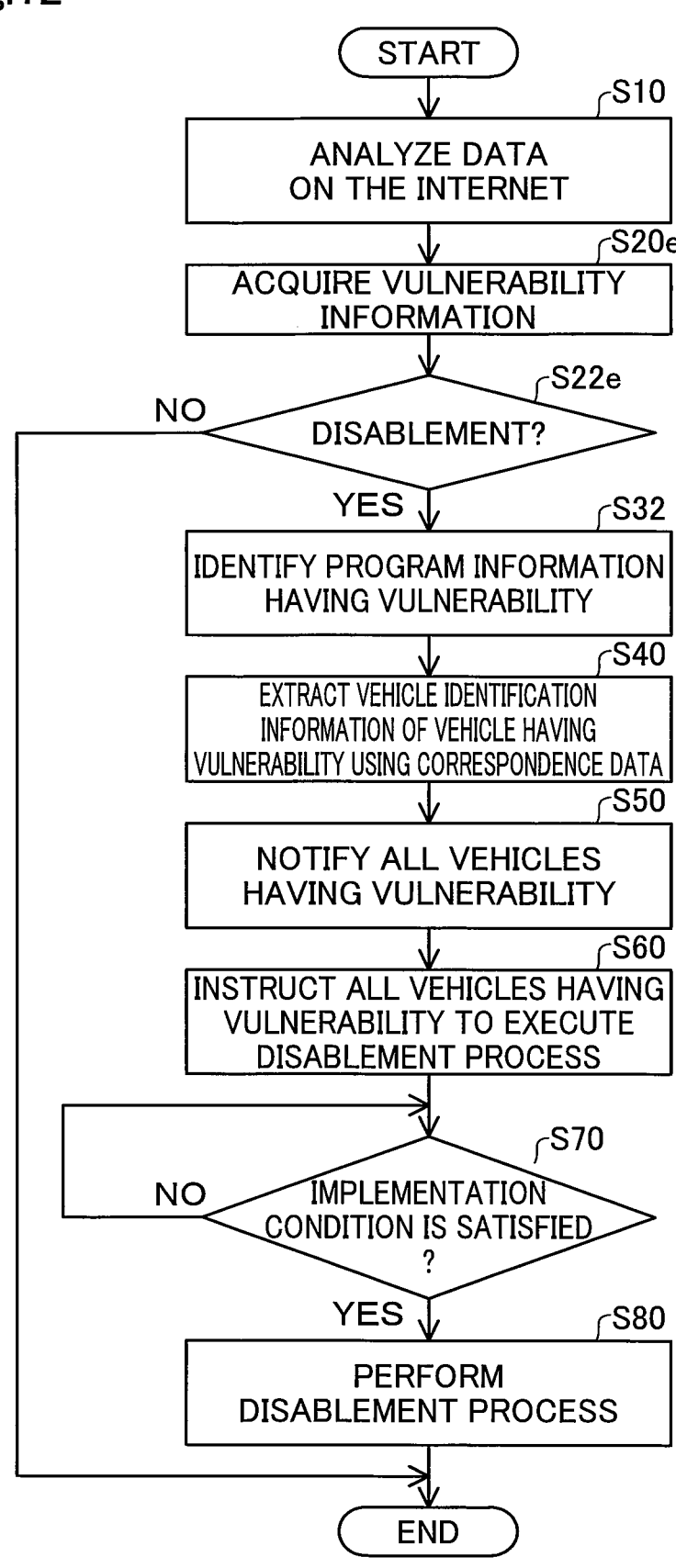
FIG. 12 is a flowchart of a remote control disablement method according to the fifth embodiment.

FIG. 12 is a flowchart of a remote control disablement method according to the fifth embodiment. The remote control disablement method according to the fifth embodiment differs from the remote control disablement method according to the first embodiment in that it further has the steps S10 and S32, and that it has the steps S20e and S22e instead of the steps S20 and S22, and otherwise is similar to the first embodiment in its structure.

In the step S10, the information acquisition unit 512e moves between websites by following links, etc. in the websites, and performs analysis (parsing) of the websites in the destination. The information acquisition unit 512e analyzes data including at least one of text data and image data, for example, such as text data, HTML, CSS, JavaScript (registered trademark), image data, video data, audio data, and the like, in the website. In the step S20e, the information acquisition unit 512e acquires the vulnerability information as a result of analysis of the website. The information acquisition unit 512e may acquire the vulnerability information further from the reports from the vehicle 100, the remote control device 300, the information provision device 400, and the like.

In the step S22e, the identification unit 517 analyzes the acquired vulnerability information and determines whether or not to perform the disablement. If the identification unit 517 determines to disable the remote control function (S22e: YES), the identification unit 517 forwards the process to the step S32. In the step S32, the identification unit 517 refers to the acquired vulnerability information to identify the program information 225 having vulnerability from among the remote control program 224.

As described above, the vehicle management device 500e of the present embodiment includes the identification unit 517 that identifies the program information 225 having vulnerability using the acquired vulnerability information. Therefore, the vehicle 100 having vulnerability can be extracted rapidly compared to the case of manually identifying the program information 225 having vulnerability.

According to the vehicle management device 500e of the present embodiment, the information acquisition unit 512 acquires the vulnerability information further by analyzing data containing at least one of text and image via the Internet. Therefore, the vulnerability information can be acquired automatically, and the acquisition range for the vulnerability information can be expanded to websites and the like on the Internet.

Figure 13:
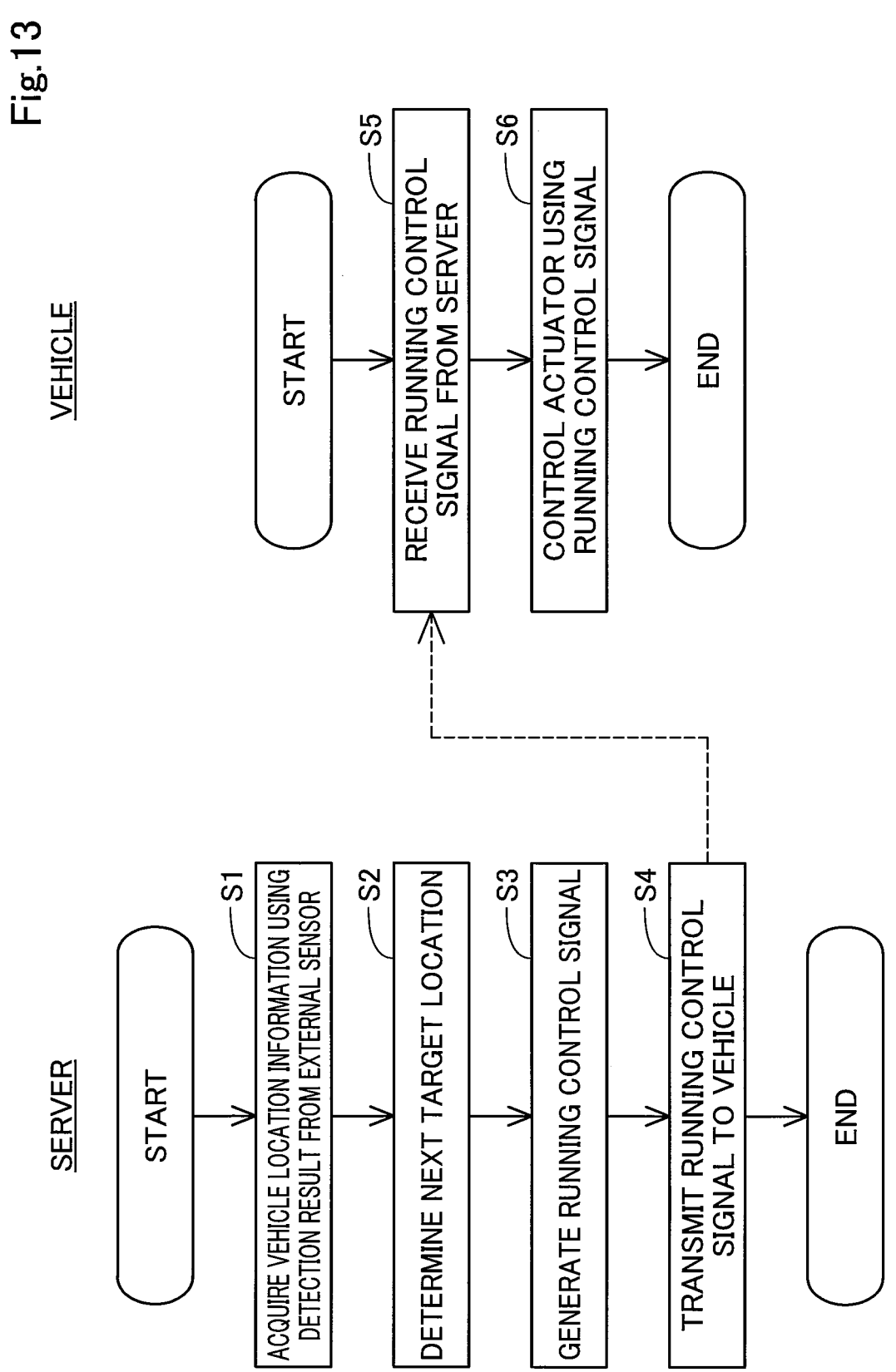
FIG. 13 is a flowchart of procedures in the process of running control for a vehicle that can be applied to each embodiment.

FIG. 13 is a flowchart of procedures in the process of running control for a vehicle that can be applied to each embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the remote control unit 300 or a server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 200 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

F. Other Embodiments (F1) The first embodiment described above shows an example in which the remote controller 312 is provided in the remote control device 300. In contrast, all or part of the functions of the remote controller 312 may be provided in the vehicle management device 500.

(F2) Each of the embodiments described above shows an example in which the correspondence data 522 is stored in the storage device 520 of the vehicle management device 500. In contrast, the correspondence data 522 may be omitted in some cases such as the case where it is easy to identify the vehicle 100 subjected to the disablement, for example, when there are few types of program information 225 of the remote control program 224. The vehicle management device 500 thus structured can also ensure the same effects as those of the first embodiment.

(F3) The first embodiment described above shows an example in which the vehicle management device 500 includes the notification unit 516. In contrast, the notification unit 516 may be omitted. In this case, the remote control function of the vehicle 100 is preferably disabled rapidly, for example, by shortening the period to establish the implementation condition 222.

(F4) Each of the embodiments described above shows an example in which the disablement implementation unit 214 performs the disablement process to disable the remote control function when the implementation condition 222 is satisfied. In contrast, the implementation condition 222 may be omitted. In this case, the remote control function of the vehicle 100 is disabled, for example, in response to the reception of a disablement instruction from the disablement instruction unit 514. The vehicle management device 500 thus structured can perform the process in a simplified manner, thereby rapidly disabling the remote control function of the vehicle 100 having vulnerability.

(F5) The first embodiment described above shows an example in which the implementation condition 222 is satisfied when the vehicle 100 is stopped. In contrast, the implementation condition 222 may be satisfied when the remote control function is not used in the vehicle 100. The vehicle management device 500 thus structured can inhibit or prevent implementation of the disablement process during automatic running of the vehicle 100 by remote control. Further, it is also possible to immediately disable the remote control function of the vehicle 100 in which the remote control is not being performed.

(F6) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(F7) In the above-described first embodiment, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generations of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(F8) In the above-described first embodiment, the server 300 automatically generates a running control signal to be transmitted to the vehicle 100. By contrast, the server 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(F9) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(F10) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(F11) A configuration for realizing running of the vehicle 100 by unmanned driving is also called a "Remote Control auto Driving system". Conveying a vehicle using Remote Control Auto Driving system is also called "self-running conveyance". Producing a vehicle using self-running conveyance is also called "self-running production". In self-running production, for example, at least part of the conveyance of vehicles is realized by self-running conveyance in a factory where the vehicle is manufactured.

The control and the method described in the present disclosure may be implemented by a dedicated computer that is provided by configuring a memory and a processor programmed to perform one or more functions embodied by a computer program. Alternatively, the control unit and the method thereof described in the present disclosure may be implemented by a dedicated computer that is provided by configuring a processor with one or more dedicated hardware logic circuits. Otherwise, the control unit and the method thereof described in the present disclosure may be implemented by one or more dedicated computers that are configured by combining a memory and a processor programmed to perform one or more functions with a processor configured with one or more hardware logic circuits. Further, the computer program may be stored in a non-transitory tangible computer readable storage medium, as instructions to be performed by a computer.

The present disclosure is not limited to the embodiments described above, but can be realized in various configurations without departing from the spirit thereof. For example, the technical features of the embodiments corresponding to the technical features in each of the aspects stated in the Summary section may be replaced or combined as appropriate to solve some or all of the problems described above or to achieve some or all of the effects described above. Further, if the technical feature is not described as essential in this specification, the technical feature may be deleted as appropriate.

What is claimed is:

1. A moving object management device that manages a plurality of moving objects, each moving object having a remote control function to move by remote control, comprising:
an information acquisition unit configured to acquire vulnerability information regarding vulnerability of the remote control function;
a correspondence data storage unit configured to store correspondence data between identification information of the moving object and program information regarding the remote control function provided in the moving object; and
a disablement instruction unit configured to instruct a moving object to disable the remote control function, wherein when the program information having the vulnerability is identified by using the acquired vulnerability information, the disablement instruction unit is configured to extract the identification information of the moving object having the identified program information using the stored correspondence data and instruct the moving object corresponding to the extracted identification information to disable the remote control function.

2. The moving object management device according to claim 1, further comprising an identification unit configured to identify the program information having the vulnerability using the acquired vulnerability information.

3. The moving object management device according to claim 1, wherein

23 the information acquisition unit configured to acquire the vulnerability information further by analyzing data containing at least one of text and image via Internet.

4. The moving object management device according to claim 1, further comprising a notification unit configured to notify the moving object to prompt performing at least one of disablement of the remote control function and an action to eliminate the vulnerability.

5. The moving object management device according to claim 1, further comprising a disablement implementation unit configured to perform a disablement process to disable the remote control function when, after the instruction to disable the remote control function is made, a predetermined implementation condition is satisfied.

6. The moving object management device according to claim 5, wherein the implementation condition is that radio waves for remote control which have been detected by the moving object are no longer detected, the moving object comprising the disablement implementation unit and a moving object communication unit for receiving the radio waves for the remote control, and having received the instruction to disable the remote control function.

7. The moving object management device according to claim 5, wherein the implementation condition is that the moving object that has received the instruction to disable the remote control function has been stopped.

8. The moving object management device according to claim 5, wherein the implementation condition is that the remote control function is not used in the moving object.

9. The moving object management device according to claim 6, wherein the implementation condition is that a moving speed of the moving object that has received the instruction to disable the remote control function falls to or below a predetermined reference speed.

10. The moving object management device according to claim 5, wherein the implementation condition is that all passengers on board the moving object have gotten off the moving object.

11. The moving object management device according to claim 1, wherein the moving object is a vehicle that is capable of running by the remote control within a factory during a manufacturing process in the factory where the vehicle is manufactured.

12. The moving object management device according to claim 1, wherein the vulnerability information is at least one of information regarding security hole in the remote control function, information regarding hacking of the remote control function, information regarding defect in a program regarding the remote control function, information regarding computer virus that affects the remote control function, and information regarding distrust of the remote control function.

13. A moving object management system that manages a plurality of moving objects, each moving object having a remote control function to move by remote control, the system comprising:

a disablement implementation unit that is provided in the moving object and configured to perform a disablement process to disable the remote control function;

an information acquisition unit configured to acquire vulnerability information regarding vulnerability of the remote control function;

a correspondence data storage unit configured to store correspondence data between identification information of the moving object and program information regarding the remote control function provided in the moving object; and a disablement instruction unit configured to instruct the disablement implementation unit of the moving object to disable the remote control function, wherein when the program information having the vulnerability is identified by using the acquired vulnerability information, the disablement instruction unit is configured to extract the identification information of the moving object having the identified program information using the stored correspondence data and instruct the disablement implementation unit of the moving object corresponding to the extracted identification information to disable the remote control function.

14. A method of disabling remote control function for a plurality of moving objects, each moving object having a remote control function to move by remote control, the method comprising:

acquiring vulnerability information regarding vulnerability of the remote control function;

storing correspondence data between identification information of the moving object and program information regarding the remote control function provided in the moving object; and when the program information having the vulnerability is identified by using the acquired vulnerability information, extracting the identification information of the moving object having the identified program information using the stored correspondence data and instructing the moving object corresponding to the extracted identification information to disable the remote control function.

* * * * *